United States Patent Office 3,118,143
Patented Jan. 14, 1964

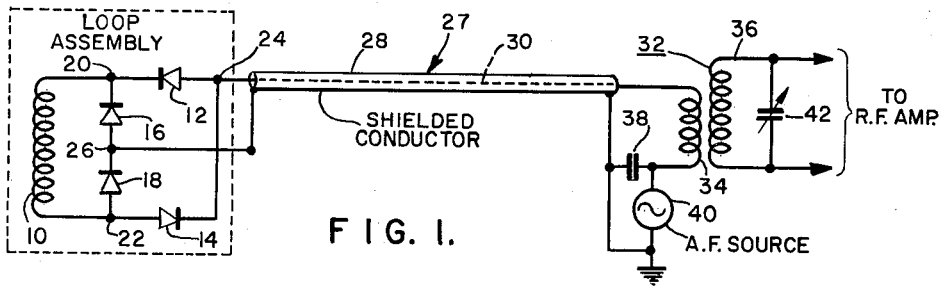
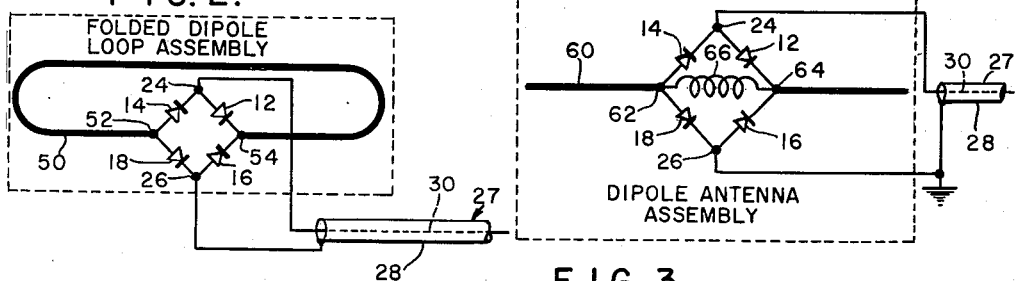
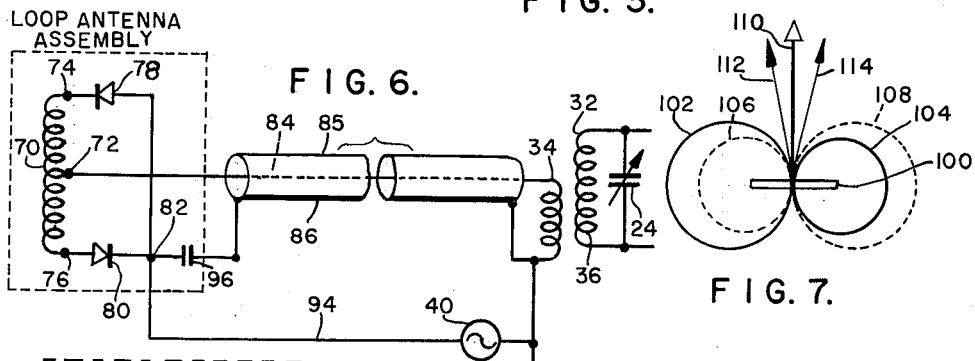
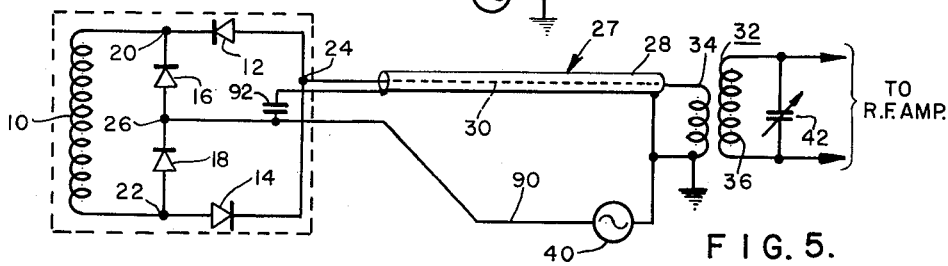
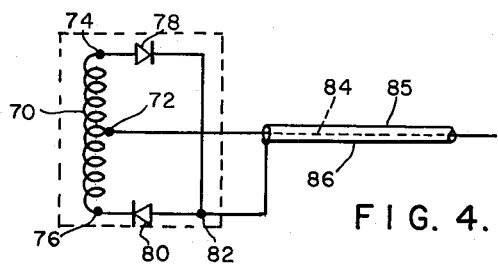
*INVENTOR.*
RAYMOND L. BURNS

3,118,143
LOOP-ANTENNA-SWITCHING SYSTEM
Raymond L. Burns, 531 W. Manchester Blvd.,
Inglewood, Calif.
Filed Jan. 23, 1961, Ser. No. 84,170
12 Claims. (Cl. 343—120)

This invention relates to radio direction-finding apparatus and, more particularly, to circuits employed for switching the radio direction-finder antenna and for connecting that antenna to the receiver input.

When a loop antenna is positioned so that the plane defined thereby is at right angles to a radio-transmitting antenna, to which the direction-finding receiver associated with said loop antenna is tuned, the waves from the transmitting antenna arrive at each side of the loop antenna at the same time and have the same amplitude and phase relationship. This results in equal voltages being induced in each side of the loop antenna, and, since currents resulting therefrom travel around the loop in opposite directions, there is a zero resultant current and hence zero output from the loop. This zero-output position is most commonly used for direction finding and is known as the "null" position.

If the antenna loop is turned so that its plane presents any except a right-angle position to the transmitting antenna, the loop windings closest to the transmitting antenna will have a voltage induced into them sooner than into the rest of the windings. This voltage will lead the rest of the windings in phase; therefore, the two voltages will no longer cancel each other, resulting in current flow and a consequent output voltage from the loop.

From what has just been described, it may be seen that the phase of the loop current reverses as the loop is rotated from one to the other side of the null position. It may also be seen that the loop will have two null positions. If the loop antenna is perfectly balanced and electronically symmetrical with respect to ground, these two null positions will be exactly 180° apart. Such perfect balance is very difficult to achieve in practice, but is a very desirable structure in order to prevent the reception pattern of the loop antenna having a greater output on one side of the null position than on the other side. There are means well known in the art for resolving the 180° ambiguity presented as a result of this loop having two nulls. The method used to detect phase relationships of currents within the loop is also well known in the art, whereby the actual determination of the direction of the transmitting antenna with respect to the loop antenna is determinable.

In modern direction finders, the loop-antenna output voltage is switched in phase at an audio-frequency rate, so that when the loop is at other than the null position, the voltage signals in the receiver will be amplitude modulated. This modulation is due to the fact that on one-half of the audio-frequency cycle the loop-antenna output is greater than on the other half of the cycle. A low-impedance loop antenna is used with practically all modern loop voltage-switching direction finders. The loop-antenna output voltage in modern direction finders is switched in phase, not at the loop antenna itself, but within the receiver or amplifier. The loop antenna is constructed as symmetrically as possible, usually with a grounded center tap and with two or more shielded conductors connected between the antenna and a balanced input to the amplifier or to the receiver.

Early direction finders employed switching circuits which switched at the loop itself. However, they used high-impedance tuned loops, which have a number of drawbacks. One of these is that the conductors between the loop and the radio-frequency amplifier of the receiver are very hard to keep balanced. Another is that the capacity of the conductors required is in parallel with that of the tuning capacitors for the loop antennas; thus, the frequency range of the tuning capacitor is cut down. Still another drawback is that the requirement of maintaining a balanced circuit, which is imposed on a condition that the tuning capacitor must also be balanced with respect to ground, is most difficult to accomplish in practice.

A further problem whch arose was that the tuning capacitor had to be located at the loop end of the conductors carrying the loop signals to the receiver, since any diodes or other electronic switching devices in series with the tuned circuit would drastically lower the efficiency or Q of the circuit, so as to render it substantially useless. Thus, the necessity of locating the tuning condenser on the loop end of the conductors makes tuning and ganging of the tuned circuits difficult and cumbersome. Most of the previously used circuits necessitated a center-tap loop, arranged so that the output voltage is taken from only one-half of the loop, thus utilizing only one-half of the available loop voltage. Further, at least two conductors and a ground connection were required in these prior art systems, and, also, the antenna effect was much greater, since the loop contained more wire and had a high impedance. Any detuning of the loop greatly increased this antenna effect and thus changed the directional properties of the loop.

It is believed that because of these difficulties, designers of modern direction finders now use structures using low-impedance loops which are switched by switching circuits located at the receiver.

An object of the present invention is to provide a system for switching the phases of the output voltages of a loop antenna which is located at the loop antenna and which eliminates indicated shortcomings of prior-art arrangements.

Another object of the present invention is the provision of a novel loop-switching circuit, wherein only a single shielded conductor or a conductor and a common ground connection are required between the loop assembly and the receiver or amplifier.

Yet another object of this invention is the provision of a novel loop-switching circuit with which an effect of electrical balance is obtained, even though a single shielded conductor (or conductor and a common ground) are employed between the loop assembly and other associated equipment.

Still another object of the present invention is the provision of a loop-switching circuit with effective electrical balance, which, in the case of a rotatable loop assembly, requires only one slip ring, or other rotatable connection, and a ground connection.

Yet another feature of the present invention is the provision of a loop-switching circuit wherein one side of the input to the radio-frequency amplifier employed at the front end of the radio receiver is grounded, thus eliminating the need for balance coils and other balance circuitry.

Another object of the present invention is to provide a novel loop-switching circuit which affords a simpler connection between the switching circuit and the receiver than possible heretofore.

These and other objects of the invention are achieved in a switching arrangement which includes at least two diodes. The antenna or loop has a terminal connected to each of the two ends thereof. The anode of the first diode is connected to one of the terminals, and the cathode of the second diode is connected to the other of the terminals. The first diode-cathode and the second diode-anode are connected together to from a junction. A source of switching signals is provided, and these signals are applied to the first and second diodes and to the antenna in a manner to close the first and second diodes alternately to the flow of signal currents from the antenna. The switching signals are applied over means including two conductors, which may be in the form of a coaxial cable having a center conductor and a cable shield. The switching arrangements may also include a third and fourth diode, which are connected in the manner described for the first and second diode, between the two antenna terminals. The junction formed by the third and fourth diodes serves as a terminal to which the one of the two conductors may be connected.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a circuit diagram of an embodiment of the invention;

FIGURE 2 is a circuit diagram of an embodiment of the invention illustrated in connection with a folded dipole antenna;

FIGURE 3 is a circuit diagram of an embodiment of the invention illustrated in connection with a dipole antenna;

FIGURE 4 is a circuit diagram of an embodiment of the invention using two diodes, for an antenna of the type having two equal sections and a center tap;

FIGURES 5 and 6 are embodiments of the invention showing how, if desired, an extra wire connection may be employed; and FIGURE 7 is a diagram of antenna patterns shown to illustrate advantages of using this invention.

FIGURE 1 is a circuit diagram of an embodiment of the invention. A loop antenna 10 may be switched, in accordance with this invention, by means of unilateral conducting devices, such as diodes 12, 14, 16, and 18. These diodes are connected to two terminals 20, 22 which are at opposite ends of the antenna loop 10. The cathodes of diodes 12 and 16 are connected to terminal 20, and the anodes of diodes 14 and 18 are connected to terminal 22. The cathode and anode of diodes 14 and 12 are connected together to form a junction 24, and the respective anode and cathode of diodes 16 and 18 are connected together to form a junction 26.

The junction 26 is grounded and then connected to the shield 28 of a coaxial cable 27, comprising the shield 28 and a central conductor 30. The coaxial cable connects the antenna and switching equipment to the receiver input, which includes a transformer 32 having a primary winding 34 and a secondary winding 36. One end of the primary winding 34 is connected to the conductor 30; the other end is connected to a capacitor 38, which has its opposite plate connected to the shielded conductor 28. An audio-frequency switching-voltage source 40 has one side grounded and connected to the shield 28 of the shielded conductor. The other side of the audio-frequency voltage-switching source 40 is connected to the junction between the capacitor 38 and the primary winding 34. The secondary winding 36 is tuned by the variable capacitor 42 and is also connected to the following apparatus, such as the radio frequency amplifier of the radio direction-finding receiver.

The diodes shown in the drawings are normally located physically as close to the antenna loop 10 as possible, and are so mounted and wired as not to cause any unbalance of the loop. Those cases where the loop is of the rotating type, the diodes are part of the rotating assembly. It should be understood here that, although diodes are shown, these are by way of illustration, since those skilled in the art will readily appreciate how to employ other devices, such as transistors, for performing the diode functions without departing from the spirit and scope of this invention.

Whenever any of the diodes 12, 14, 16, 18 are conducting, the radio-frequency voltage from the loop antenna 10 will be connected through the conducting diode to the associated circuitry. The appropriate diodes are caused to conduct (close) by the polarity of the currents generated by the audio-frequency source. During a positive half-cycle from the audio-frequency source, electrons flow from the audio-frequency source through the common ground conductor, through diode 18, through the antenna 10, through diode 12, through the inner conductor 30, and through the winding 34 back to the audio-frequency source. Diodes 12 and 18 are therefore "closed" and diodes 16 and 14 are "open" or nonconducting, and therefore perform no functions during this positive half-cycle. Terminal 20 of the antenna 10 may be considered as connected to the inner conductor 30 of the shield conductor and terminal 22 of the antenna may be considered as connected to ground.

During the negative half-cycle of voltage from the audio-frequency source, electrons flow from the audio-frequency source 40 through the winding 34 (capacitor 38 has its value selected to provide a high impedance to audio current and a low impedance to radio-frequency current), through the inner conductor 30, through diode 14, through the antenna, through diode 16, through ground, or the shielded conductor, back to the audio-frequency source. Accordingly, diodes 14 and 16 are closed, and diodes 12 and 18 are open. Terminal 20 of the antenna may thus be considered to be connected to ground during the negative half-cycle of voltage from the audio-frequency source, and terminals 22 of the antenna may be considered as being connected to the inner conductor 30.

From the preceding description, it will be appreciated that the antenna connections are reversed (or switched) whenever the output from the audio-frequency source changes direction of current flow. As an analogy of the circuit shown in FIGURE 1, the diode switches may be considered as a double-pole, double-throw switch arrangement. Only a single shielded conductor, which effectively equals two wires, connects the antenna with the input to the receiver. Thereby, the problems which exist with devices of this type, some of which have been previously set forth herein, are obviated. No more than one shielded conductor has to be used.

FIGURE 2 is a circuit diagram of an embodiment of the invention which is employed for switching a folded-dipole-loop assembly. Structures in FIGURE 2 which perform identical functions as those in FIGURE 1 bear identical reference numbers. The folded-loop antenna 50 has two terminals, respectively 52, 54, at its opposite ends, to which the switching diodes, respectively 12, 14, 16, and 18, are connected. The junctions 24, 26 formed by these diodes are connected to a shielded cable 27, having a center conductor 30 and a shield 28. The shielded-cable connections to the circuitry, which is at the input to the receiver, is not shown in FIGURE 2, since it is identical with that described in connection with FIGURE 1. The diodes connected to the two terminals at the ends of the folded-dipole-loop antenna 50 are opened and closed in the same manner as has been described in connection with FIGURE 1, so that first radio-frequency current of one polarity can flow from the antenna to the receiver, and then radio-frequency current of the opposite polarity can flow from the antenna to the receiver, as determined by the polarity of the current flow from the audio-frequency switching source.

FIGURE 3 is a circuit diagram of an embodiment of the invention which is illustrated in connection with a dipole antenna. Here, too, those components which perform the identical functions as the one shown and described in connection with FIGURE 1 bear the same reference numerals. The dipole antenna 60 has two terminals 62, 64, which may be considered at its two ends. Connected across these two terminals is a radio-frequency choke coil, which performs the function of providing a path for the audio-frequency switching voltages which are applied to the junctions 24, 26. Diodes 14 and 18 are connected, respectively, from terminal 62 to junction 24 and from terminal 62 to junction 26. Diodes 12 and 16 are connected, respectively, from terminal 64 to junction 24 and from terminal 64 to junction 26. Junction 24 is connected to the inner conductor 30, and junction 26 is connected to ground as well as to the shield 28 of the shielded coaxial conductor 27. The shielded coaxial conductor connects to the same type of input apparatus for the receiver as shown in connection with FIGURE 1; therefore, this is omitted here.

The operation of the diodes in response to the audio-switching signals is the same as has been described in FIGURE 1 and permits radio-frequency current first having one polarity, then the opposite polarity, to flow successively through the shielded conductor to the input of the receiver. Since the audio-frequency current in this case cannot find a complete circuit path through the dipole antenna, the radio-frequency choke 66 provides that function. Thus, current from an audio-frequency source can flow through the inner conductor 30 to the junction 24, through the diode 12 to the terminal 64, through the radio-frequency choke 66 to the terminal 62, through diode 18 to junction 26, and back to the audio-frequency source through the shield 28. The path of the audio-frequency current, which flows through the shield 28 to junction 26, passes through diode 16, terminal 64, radio-frequency choke 66, terminal 62, diode 14, junction 24, and back to the audio-frequency source through the inner conductor.

FIGURE 4 is a circuit diagram illustrating an embodiment of the invention which employs two diodes which can be used with an antenna of the type having a center tap and having two equal antenna sections. As shown in FIGURE 4, the antenna 70 has a center-tap terminal 72 and terminals at both ends, respectively 74, 76. A first diode 78 has its anode connected to the terminal 74; a second diode 80 has its cathode connected to the terminal 76. The cathode of diode 78 and the anode of diode 80 are connected to a junction 82. This junction is connected to ground, as well as to the shield 86 of the coaxial conductor 85. The center-tap terminal 72 is connected to the central conductor 84 of the coaxial conductor.

The apparatus to which the coaxial conductor is connected at the receiver is identical with that described and shown previously in connection with FIGURE 1, and thus bears identical reference numerals. The operation of the circuit is similar with that previously described, except that in this case only two diodes are used and the radio frequency current is always taken from the center-tap of the loop antenna 70. The two diodes serve to connect to ground alternately the two antenna end terminals 74 and 76. Only one-half of antenna 70 is used during each half-cycle from the audio frequency switching source. During the positive half cycle from the audio frequency switching source, electrons flow through the shield or ground conductor to junction 82, through diode 78, through antenna section 74—72 to terminal 72, through the shielded conductor 84 and through transformer primary winding 34 back to the audio frequency source 40. During this time diode 78 is conducting, thereby grounding end 74 of the loop antenna 70. The radio frequency current is taken from section 74—72 of loop antenna 70. In a similar fashion, during a negative half-cycle from the audio frequency switching source, diode 80 is conducting, thereby grounding end 76 of loop antenna 70. Radio frequency current is now taken from section 76—72 of loop antenna 70.

It may be desired to use a third conductor in an embodiment of the invention, such as shown in FIGURE 1. In this event, an arrangement, such as shown in FIGURE 5, may be employed. In FIGURE 5, similar functioning structures are provided with the identical reference numerals as in FIGURE 1. The connections of the diodes 12, 14, 16, 18 to the antenna terminals 20, 22 are identical with those shown in FIGURE 1, and the operation of the diodes in response to the audio-frequency signals from the source 40 are also the same as has been described. The difference between FIGURE 1 and FIGURE 5 is that a third conductor 90 has been added which connects one side of the audio-frequency source 40 to the junction 26 and also to one side of a radio-frequency bypass capacitor 92. The other side of the radio-frequency bypass capacitor 92 is connected to ground. The other side of the audio-frequency source 40 is connected to ground, to the shield 28 of the coaxial conductor, and to one side of the primary winding 34. The other side of primary winding 34 is connected to the center conductor 30. The other end of the center conductor is connected to the junction 24.

The radio-frequency current path between junctions 24 and 26 and primary winding 34 are the same as they were in FIGURE 1, namely, over the inner conductor 30 and outer conductor, or shield 28, which is grounded. The current from the audio-frequency source 40, however, differs in that the current flows over the conductor 90 to the junction 26 and over the inner conductor 30, whereas previously it flowed over the inner conductor 30 and the shield 28. It should be noted, however, that in both FIGURE 1 and FIGURE 5 there is a conductor which carries both radio-frequency and audio-frequency currents. This is performed by the inner conductor in all cases. Conductor 30 in FIGURES 1, 2, 3, 5. Conductor 84 in FIGURES 4 and 6.

FIGURE 6 shows a three-conductor arrangement for the embodiment of the invention of the type shown in FIGURE 4. Similar functioning structure has the same reference numerals applied thereto, as in FIGURE 4. The third conductor 94 connects one side of the audio-frequency source 40 to the junction 82. This junction is connected to a radio-frequency bypass capacitor 96, which, in turn, is connected to ground. Both ends of the shield 86 are grounded. The other side of the audio-frequency source 40 is connected to ground. One side of the primary winding 34 of the transformer 36 is connected to ground and to the shield 86; the other side of the primary winding is connected to the inner conductor 84, which in turn is connected to the center tap 72 of the antenna 70.

The operation of the arrangement shown in FIGURE 6 is identical with that previously described for switching the diodes 78 and 80. Radio-frequency currents flow through the inner conductor 84 and outer shield 86 from the antenna 70 to the primary winding 34. Audio-frequency currents for switching the diodes flow through the third conductor 94 and the inner conductor 84 to the diodes 78, 80, in order to cause them to alternately open and close.

It is commonly known by those well skilled in the art of radio direction finding that any unbalance in an antenna-loop circuit with respect to ground will cause errors in bearing. Reference is now made to FIGURE 7 of the drawings, which is a representation of the pattern of an antenna being switched, shown to assist in an understanding and appreciation of this invention. The plane of the loop antenna is represented by the small rectangle 100. The solid-line circles, respectively 102, 104, represent the antenna-loop pattern with one end grounded. The dashed-line circles, respectively 106, 108, represent the antenna pattern with the other end grounded. The vertical arrow 110 represents zero error; the arrow 112 to the left thereof represents the error when an antenna loop has the pattern represented by the circles 106, 108. The arrow 114 to the right of the center line 110 represents the error which is caused when an antenna loop has the pattern represented by the circles 102, 104.

A perfectly balanced antenna loop will have a reception pattern which is symmetrical, as may be represented by the circle 102 and the circle 108. However, an antenna with a perfectly symmetrical reception pattern is difficult to achieve. Antenna patterns more nearly resemble those represented in FIGURE 7. However, since during each half-cycle of the audio-frequency source, in accordance with this invention, one end or the other of the loop is connected to ground, and, further, since the same value of capacitance and inductance exists during each half-cycle when this invention is employed, the antenna-pattern errors are equal, but deviate from the true bearing in opposite directions. The average deviation then is zero, since these alternate bearings will cancel each other. The average output from the loop, accordingly, may be represented by the vertical arrow 110 in FIGURE 7, which is the true bearing. The net result is that in accordance with this invention an effective electrical balance is achieved, despite the fact that the antenna loop has an unsymmetrical reception pattern.

There has accordingly been shown and described herein a novel, useful, and economical loop-switching circuit, wherein a minimal number of conductors between the loop assembly and other associated equipment is required. Despite this fact, a loop-switching circuit with which an effective electrical balance is obtained is provided. Thereby, a need for a balanced coil and additional balanced circuitry, heretofore required, is obviated.

I claim:

1. In a radio direction finder wherein the polarity of the connections of the antenna to a receiver are alternately switched from a source of switching signals, both said receiver and said source having a ground potential connection, said antenna having a terminal at each of the two ends thereof, an improved switching arrangement comprising a first and a second diode each having an anode and a cathode, means for connecting said first diode anode to one of said terminals, means connecting said second diode cathode to the other of said terminals, means connecting said first diode cathode to said second diode anode to form a junction, a source of switching signals, and means for applying switching signals from said source to said first and second diodes and antenna to alternately connect said first and second diodes to the flow of signal currents from said antenna, said means for applying switching signals consisting solely of two conductors, one of which has a substantially nonresistive connection between said ground potential connection and said junction to be at the ground potential of said connection, and one of which carries both switching signals and current from said antenna to the receiver and switching signal source.

2. In a radio direction finder as recited in claim 1 wherein said antenna is of the type that has a third terminal connected to the center thereof, and the one of said two conductors not connected to said junction has a substantially nonresistive connection to said third terminal.

3. In a radio direction finder as recited in claim 1 wherein said means for applying switching signals includes a third and fourth diode each having an anode and a cathode, means connecting said third diode anode to said first diode anode, means connecting said fourth diode cathode to said second diode cathode, means connecting said third diode cathode to said fourth diode anode to form a second junction, and means connecting the other of said two conductors with a substantial nonresistive connection to said second junction.

4. In a radio direction finder as recited in claim 1 wherein said two conductors comprise a coaxial cable having an inner conductor and shield, the one of said two conductors for applying switching signals which carries both switching signals and current from said antenna comprises the inner conductor of said coaxial cable, the other of said conductors comprises the shield of said coaxial cable.

5. In a radio direction finder of the type wherein the polarity of the connection of an antenna to a receiver are alternately switched by a source of switching signals, both said receiver and said source having a ground potential connection said antenna having a terminal at each two ends thereof, an improved switching arrangement comprising first, second, third, and fourth unilateral conducting means, each having two ends, means connecting one end of each said first and third unilateral conducting means to one of said antenna terminals, means connecting one end of each second and fourth unilateral conducting means to the other of said antenna terminals, means connecting together the other ends of said first and third unilateral conducting means to form a first junction, means connecting together the other ends of said second and fourth unilateral conducting means to form a second junction, and means for connecting said first and second junctions to said source of switching signals and to said receiver, said means consisting of first conductor means for carrying both radio frequency and switching signals, and second conductor means connected to said ground potential connection to be at the ground potential of said connection.

6. In a radio direction finder of the type wherein the polarity of the connection of the antenna to a receiver are alternately switched by a source of switching signals, both said receiver and said source having a ground potential connection, said antenna having thereon three terminals, a first of said three terminals connecting to the center of said antenna and the second and third of said three terminals respectively connecting to the two ends of said antenna, an improved switching arrangement comprising first and second unilateral conducting means each having two ends, means connecting one of the ends of said first and second unilateral conducting means together to form a junction, means connecting the respective other ends of said first and second unilateral conducting means to the respective second and third antenna terminals, and means for connecting said first terminal and said junction to said source of switching signals and to said receiver, said means consisting of first conductor means for carrying both radio frequency and switching signals and second conductor means connected to said ground potential connection to be at the ground potential of said connection.

7. In a radio direction finder of the type wherein the polarity of the connections of an antenna to a receiver are alternately switched by a source of switching signals, said antenna having thereon two terminals at respective two ends of said antenna, an improved switching circuit comprising first, second, third, and fourth diodes, each having an anode and a cathode, means connecting the anodes of said first and third diodes to one of said antenna terminals, means connecting the cathodes of said second and fourth diodes to the other of said antenna terminals, means connecting the cathode of said first diode to the anode of said second diode to form a first junction, means connecting the cathode of said third diode to the anode of said fourth diode to form a second junction, and conductor means connecting said first and second junctions to said source of switching signals and said receiver, said conductor means consisting of a coaxial cable having a center conductor and a shield, and an additional conductor, said center conductor being connected to said first junction, a capacitor connecting said shield to said second junction, said additional conductor having one end connected to said second junction, means connecting said source of switching signals to the other end of said additional conductor, and a transformer winding connected between said source of switching signals and said center conductor.

8. In a radio direction finder of the type wherein the polarity of the connections of an antenna to a receiver are alternately switched by a source of switching signals, said antenna having thereon three terminals, a first of said three terminals connecting to the center of said antenna and the second and third of said three terminals respectively connecting to the two ends of said antenna, an improved switching arrangement comprising first and second diodes each having an anode and cathode, means connecting said first diode anode to said second of said three terminals, means connecting said second diode cathode to said third of said three terminals, means connecting said first diode cathode and said second diode anode together to form a junction, and conductor means connecting said first terminal and said junction to said receiver and source of switching signals.

9. In a radio direction finder as recited in claim 8 wherein said conductor means consists of a coaxial cable having a center conductor connected to said first terminal and having the shield of said coaxial cable connected to said junction.

10. In a radio direction finder as recited in claim 8 wherein said conductor means consists of a coaxial cable having a center conductor and a shield, and an additional conductor, said center conductor having one end connected to said first terminal, a capacitor connecting said shield to said junction, said source of switching signals being connected to the other end of said additional conductor and to said shield.

11. In a radio direction finder wherein it is desired to switch the polarity of a dipole antenna from a source of audio switching signals, both said receiver and said source having a ground potential connection, said dipole antenna having two terminals at the respective inner ends thereof, polarity switching apparatus comprising a radio-frequency choke coil connected between said two terminals, first, second, third, and fourth diodes, each having an anode and a cathode, means connecting the anodes of said first and third diodes to one of said antenna terminals, means connecting the cathodes of said second and fourth diodes to the other of said antenna terminals, means connecting the cathode of said first diode to the anode of said second diode to form a first junction, means connecting the cathode of said third diode to the anode of said fourth diode to form a second junction, and conductor means consisting of two conductors connecting said first and second junctions to said source of switching signals and to said receiver, one of said conductors carrying both radio frequency and switching signals and the other of said two conductors being connected to said ground potential connection to be at the ground potential of said connection.

12. In a radio direction finder wherein it is desired to switch the polarity of the connections of an antenna to a receiver by means of a source of switching signals, said antenna having thereon two terminals to which connection is made, an improved switching circuit comprising first, second, third, and fourth diodes, each diode having an anode and a cathode, means connecting the anodes of said first and third diodes to one of said antenna terminals, means connecting the cathodes of said second and fourth diodes to the other of said two antenna terminals, means connecting the cathode of said first diode to the anode of said second diode to form a first junction, means connecting the cathode of said third diode to the anode of said fourth diode to form a second junction, a coaxial cable having an inner conductor and a surrounding shield, means connecting the inner conductor at one end of the coaxial cable to said first junction, means connecting said shield at one end of said coaxial cable to said second junction, a transformer having a primary and a secondary winding, means connecting one end of said transformer primary winding to the other end of said coaxial cable inner conductor, means connecting said source of switching signals between the other end of said transformer primary winding and said other end of said coaxial conductor shield, a capacitor connected between said other end of said transformer primary winding and said coaxial conductor shield, and means connecting the secondary winding of said transformer to said receiver.

References Cited in the file of this patent

UNITED STATES PATENTS

| | | |
|---|---|---|
| 2,977,595 | Zisler et al. | Mar. 28, 1961 |
| 2,997,710 | Cotuno | Aug. 22, 1961 |